(12) United States Patent
Schwark (10) Patent No.: US 7,762,086 B2
(45) Date of Patent: Jul. 27, 2010

(54) NOZZLE EXTENSION ASSEMBLY FOR GROUND AND FLIGHT TESTING

(75) Inventor: Fred W. Schwark, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 194 days.

(21) Appl. No.: 12/047,226

(22) Filed: Mar. 12, 2008

(65) Prior Publication Data

US 2009/0229242 A1 Sep. 17, 2009

(51) Int. Cl.
*F02C 7/20* (2006.01)

(52) U.S. Cl. .................. 60/796; 60/798; 239/265.11; 239/265.15

(58) Field of Classification Search ............ 60/796, 60/798; 239/265.11, 165.15; 285/390, 404, 285/333
See application file for complete search history.

(56) References Cited

U.S. PATENT DOCUMENTS

| | | | | |
|---|---|---|---|---|
| 4,076,280 | A * | 2/1978 | Young | 285/39 |
| 4,130,258 | A * | 12/1978 | Fox | 244/58 |
| 4,510,794 | A | 4/1985 | Couch | |
| 4,658,579 | A | 4/1987 | Bower et al. | |
| 5,737,913 | A * | 4/1998 | Terry | 60/796 |
| 6,183,193 | B1 | 2/2001 | Glasspoole et al. | |
| 6,360,528 | B1 | 3/2002 | Brausch et al. | |
| 6,413,043 | B1 * | 7/2002 | Bouyer | 415/159 |
| 6,415,599 | B1 * | 7/2002 | Ausdenmoore et al. | 60/230 |
| 6,516,606 | B2 * | 2/2003 | Fournier et al. | 60/262 |
| 6,857,600 | B1 | 2/2005 | Walker et al. | |
| 6,892,526 | B2 | 5/2005 | Stretton et al. | |
| 6,935,591 | B2 | 8/2005 | Udall | |
| 6,945,031 | B2 | 9/2005 | Lair | |
| 6,971,229 | B2 | 12/2005 | Lair | |
| 6,971,240 | B2 | 12/2005 | Wollenweber | |
| 7,010,905 | B2 | 3/2006 | Lair | |
| 7,058,556 | B2 | 6/2006 | Desai et al. | |
| 7,086,219 | B2 | 8/2006 | Stretton et al. | |
| 7,090,165 | B2 | 8/2006 | Jones et al. | |
| 7,093,793 | B2 | 8/2006 | Lair | |
| 7,114,323 | B2 | 10/2006 | Schlinker et al. | |
| 7,127,880 | B2 | 10/2006 | Lair et al. | |
| 7,146,796 | B2 | 12/2006 | Lair | |
| 7,159,383 | B2 | 1/2007 | Barton et al. | |
| 7,189,055 | B2 | 3/2007 | Marini et al. | |
| 7,189,056 | B2 | 3/2007 | Girgis et al. | |
| 7,225,623 | B2 | 6/2007 | Koshoffer | |
| 7,244,104 | B2 | 7/2007 | Girgis et al. | |
| 7,305,817 | B2 | 12/2007 | Blodgett et al. | |
| 7,329,097 | B2 * | 2/2008 | Kirk | 415/213.1 |
| 7,377,117 | B2 * | 5/2008 | Riggi et al. | 60/796 |
| 2006/0141242 | A1 * | 6/2006 | Keener | 428/334 |
| 2006/0213198 | A1 * | 9/2006 | Arbona et al. | 60/771 |
| 2006/0218934 | A1 * | 10/2006 | Williams et al. | 60/785 |

* cited by examiner

Primary Examiner—Michael Cuff
Assistant Examiner—Phutthiwat Wongwian
(74) *Attorney, Agent, or Firm*—Carlson, Gaskey & Olds PC (57) ABSTRACT

An exhaust nozzle for a gas turbine engine according to an exemplary aspect of the present invention includes: an outer cowl; a cowl interface ring attached to the outer cowl; an acoustic nozzle; an acoustic nozzle interface ring attached to the acoustic nozzle, the acoustic nozzle interface ring attachable to the cowl interface ring; and a removable nozzle section attachable to the acoustic nozzle interface ring and the cowl interface ring.

17 Claims, 7 Drawing Sheets

NOZZLE EXTENSION ASSEMBLY FOR GROUND AND FLIGHT TESTING

BACKGROUND

The present invention relates to a gas turbine engine, and more particularly to an exhaust nozzle assembly which facilitates ground test and flight test procedures.

Convention exhaust nozzle assembly trim technology includes the physical removal of material in which ring sections of the exhaust nozzle are cut-off so as to adjust the exhaust nozzle exit area configuration. This methodology only provides for an increase in the exhaust nozzle exit area. The entire exhaust nozzle assembly must thereby be replaced required to perform further tests if too much of the exhaust nozzle is cut-off.

SUMMARY

An exhaust nozzle for a gas turbine engine according to an exemplary aspect of the present invention includes: an outer cowl; a cowl interface ring attached to the outer cowl; an acoustic nozzle; an acoustic nozzle interface ring attached to the acoustic nozzle, the acoustic nozzle interface ring attachable to the cowl interface ring; and a removable nozzle section attachable to the acoustic nozzle interface ring and the cowl interface ring.

An method of testing an exhaust nozzle for a gas turbine engine according to an exemplary aspect of the present invention includes: removably attaching a removable nozzle section attachable to an interface ring.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

Figure 1:
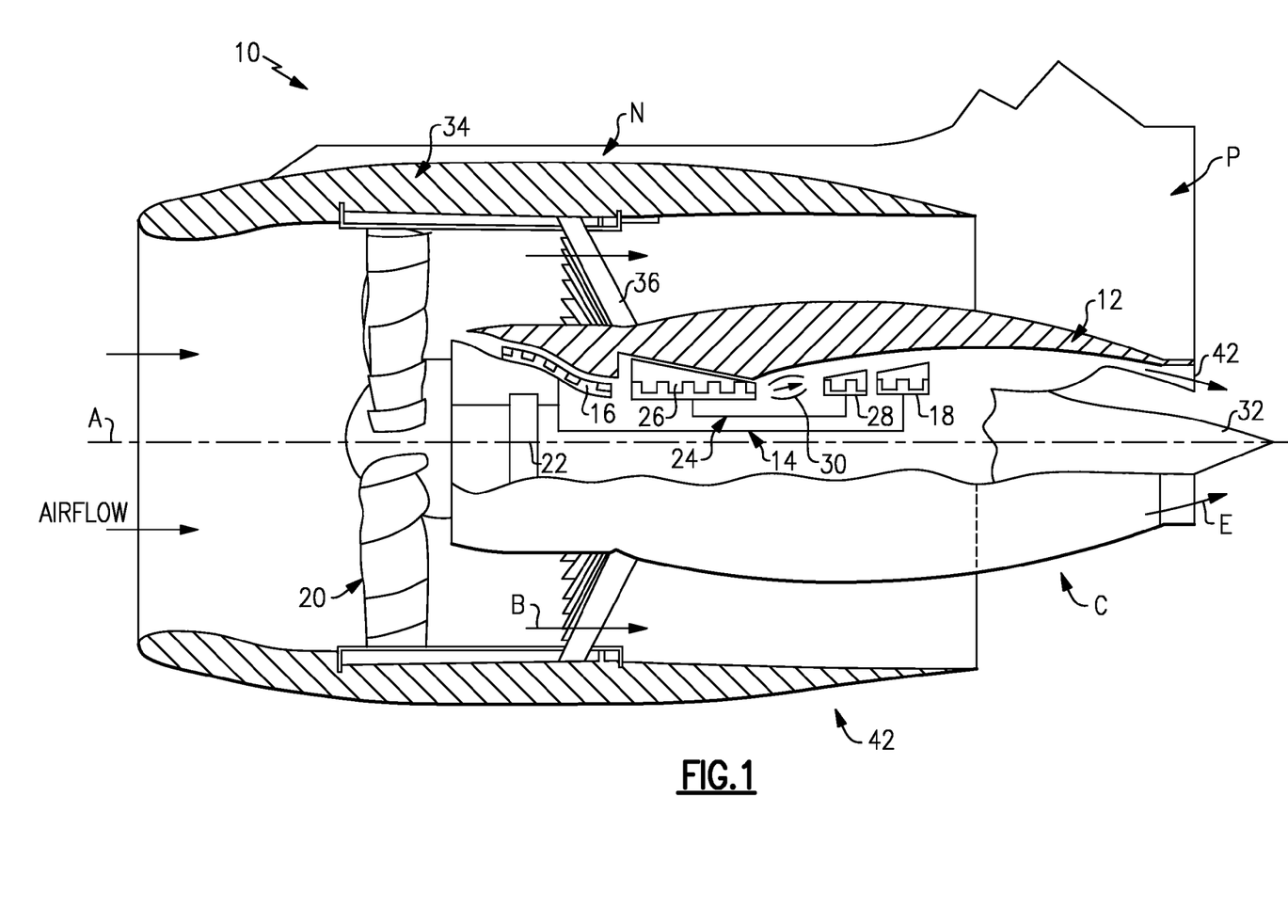
FIG. 1 is a general schematic sectional view through a gas turbine engine along the engine longitudinal axis.

FIG. 1 illustrates a general partial fragmentary schematic view of a gas turbine engine 10 suspended from an engine pylon P within an engine nacelle assembly N as is typical of an aircraft designed for subsonic operation. The engine pylon P or other support structure is typically mounted to an aircraft wing, however, the engine pylon P may alternatively extend from other aircraft structure such as an aircraft empennage.

The turbofan engine 10 includes a core engine C within a core nacelle 12 that houses a low spool 14 and high spool 24. The low spool 14 includes a low pressure compressor 16 and a low pressure turbine 18. The low spool 14 may drive a fan section 20 through a gear system 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in the disclosed embodiment is a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The gear system 22 may be an epicycle gear train such as a planetary gear system or other gear system with a gear reduction ratio of greater than 2.5:1. It should be understood, however, that the above parameters are only exemplary of one non-limiting embodiment of a geared architecture engine and that the present invention is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and, through the optional gear system 22, the fan section 20 in response to the expansion. A core engine exhaust E exits the core nacelle 12 through a core nozzle exit area 42 defined by the core nacelle 12 and a tail cone plug 32.

The core nacelle 12 is at least partially supported within the fan nacelle 34 by structure 36 often generically referred to as Fan Exit Guide Vanes (FEGVs), upper bifurcations, lower bifurcations or such like. A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular bypass flow path 40.

Figure 2:
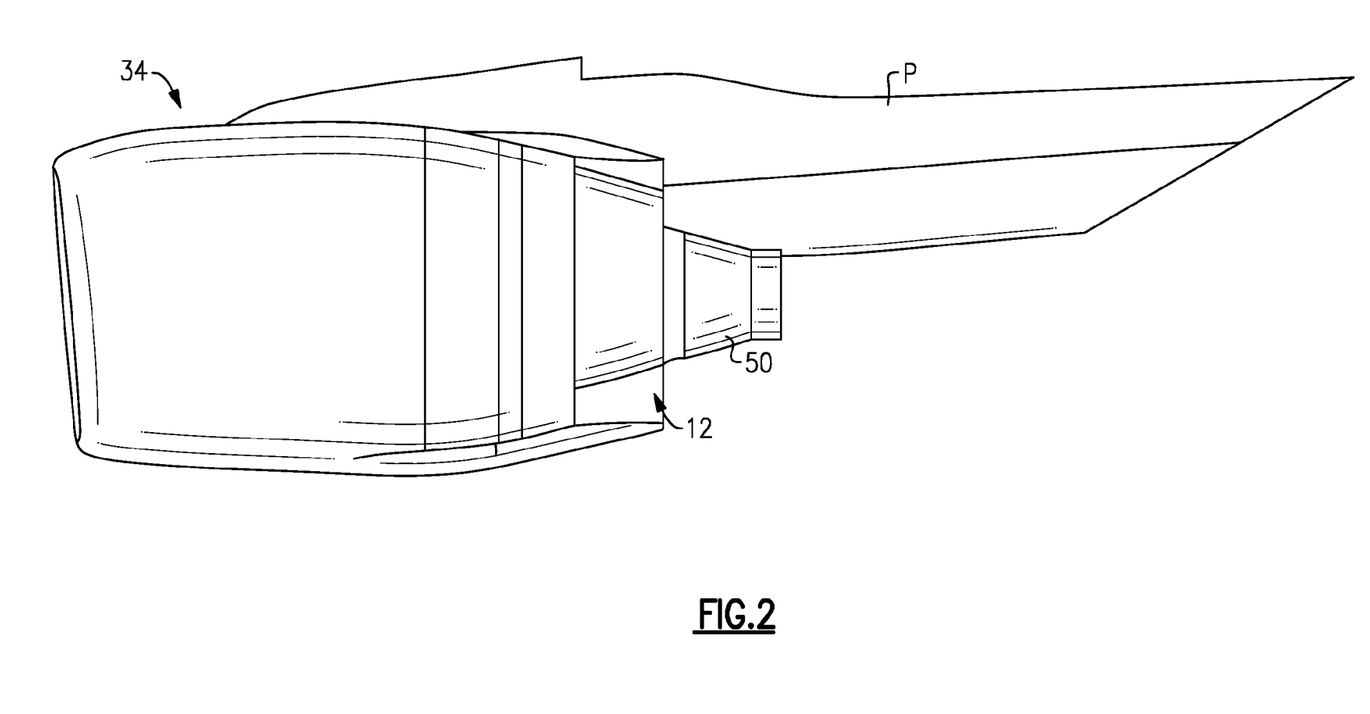
FIG. 2 is a perspective outer view of a nacelle assembly of a gas turbine engine.

Referring to FIG. 2, the core nacelle 12 includes a primary exhaust nozzle 50. It should be understood that although a core nacelle 12 is illustrated in the disclosed non-limiting embodiment, other nacelle section such as the fan nacelle 14 may also benefit from that disclosed herein.

Figure 3A:
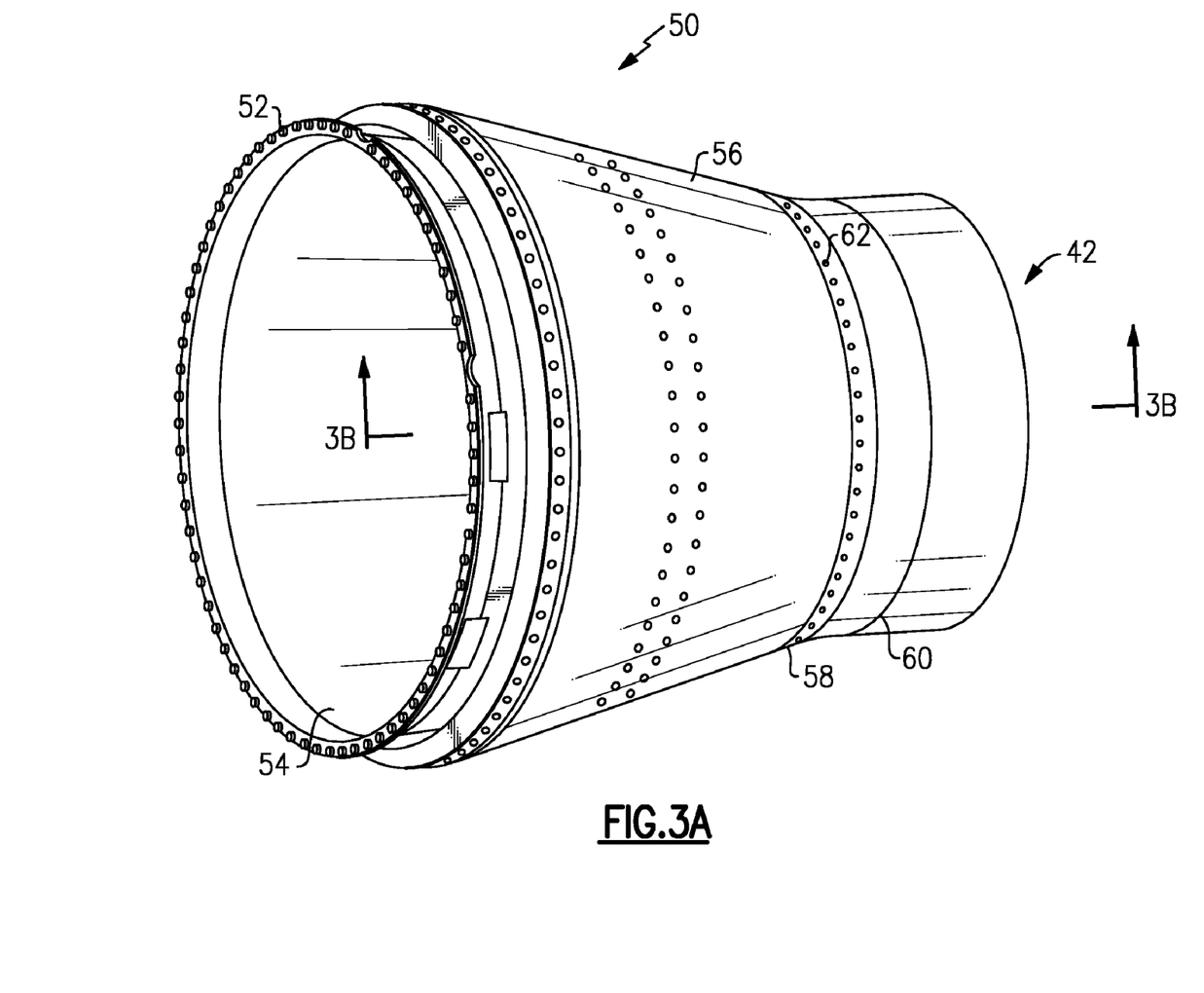
FIG. 3A is a perspective view of a primary exhaust nozzle.
Figure 3B:
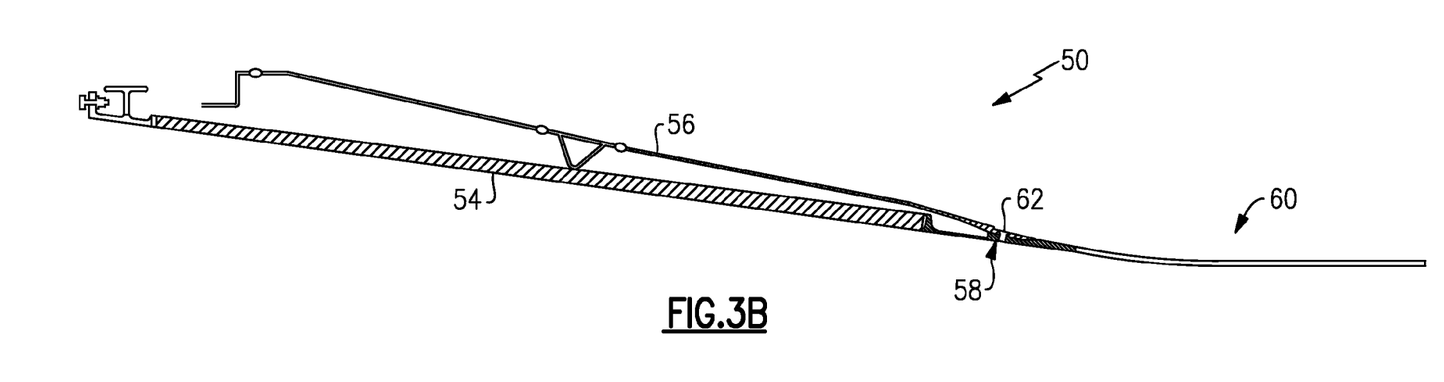
FIG. 3B is a sectional view of the primary exhaust nozzle of FIG. 3A.
Figure 3C:
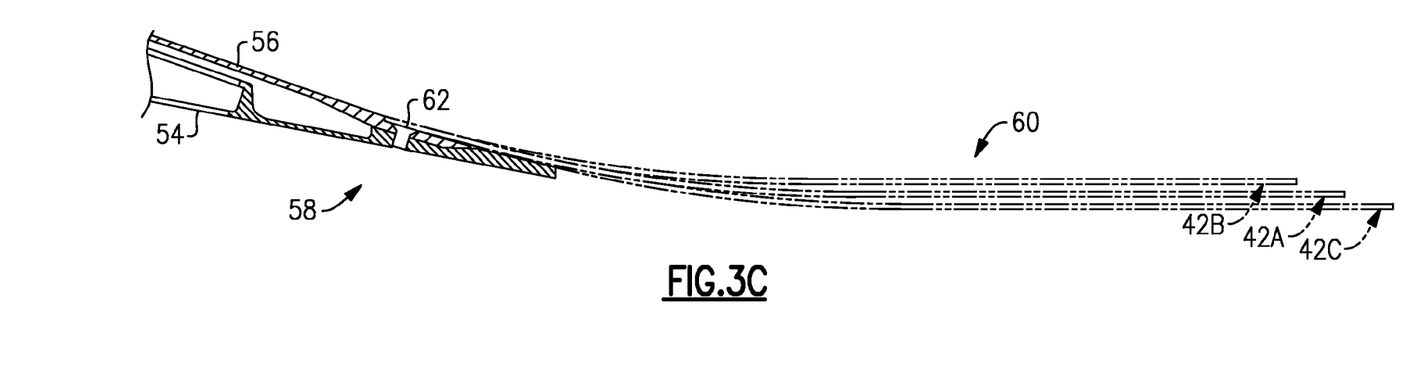
FIG. 3C is an expanded sectional view of an interface ring of the primary exhaust nozzle of FIG. 3A with a multiple of various representative removable nozzle sections attached thereto.

Referring to FIGS. 3A and 3B, the primary exhaust nozzle 50 generally includes a mount flange 52, an acoustic nozzle 54, an outer cowl 56 an interface ring assembly 58 and a removable nozzle section 60. The acoustic nozzle 54 is attached to the outer cowl 56 at the interface ring assembly 58 typically through, fasteners, welding or other attachment methods. Various removable nozzle sections 60 may be attached to the interface ring assembly 58 through fasteners 62 to define various core nozzle exit areas 42. Through the removable attachment of various removable nozzle sections 60—such as the illustrated nominal core nozzle exit area 42A;

+core nozzle exit area 42B; and −core nozzle exit area 42C (FIG. 3C) a final core nozzle exit area 42 configuration may be selected through ground test performance analysis. For example only, one demonstrator engine program requires the ability to replace the primary exhaust nozzle nominal exit area with +2.5% and −2.5% exit area extensions for ground test, however, any engine typically proceeds through this type of ground testing to perfect the core nozzle exit areas 42.

Figure 4A:
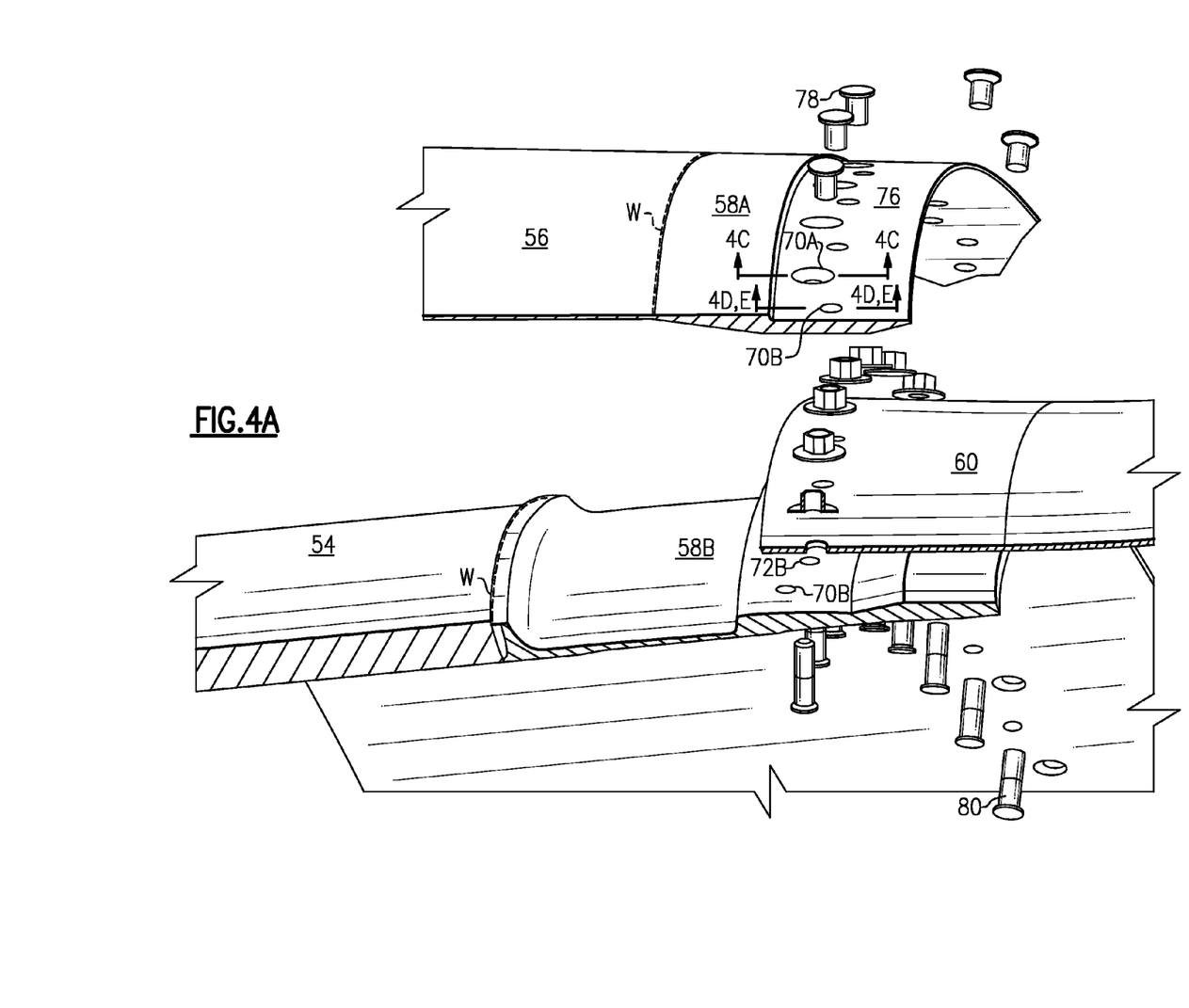
FIG. 4A is an exploded view of an interface ring of the primary exhaust nozzle.

Referring to FIGS. 4A, the interface ring assembly 58 includes a cowl interface ring 58A welded to the outer cowl 56 at a weld W and an acoustic nozzle interface ring 58B welded to the acoustic nozzle 54 at a weld W. Weld inspection is significantly improved as access is provided to both sides of the cowl interface ring 58A and the acoustic nozzle interface ring 58B.

Figure 4B:
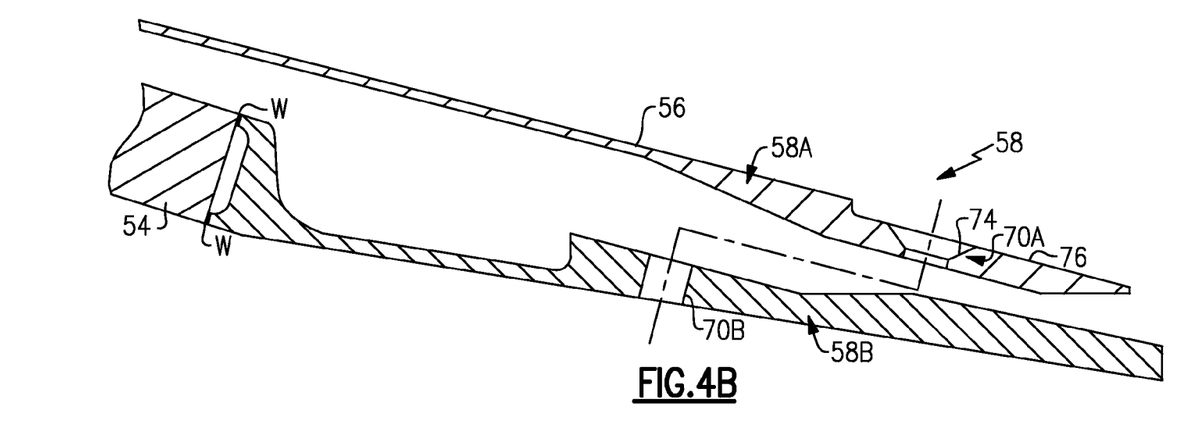
FIG. 4B is an expanded sectional view of the interface ring of the primary exhaust nozzle.

The cowl interface ring 58A and the acoustic nozzle interface ring 58B include a respective first row of apertures 70A, 70B and a second row of apertures 72A, 72B (FIG. 4B). The first row of apertures 70A within the cowl interface ring 58A are aligned with the first row of apertures 70B within the acoustic nozzle interface ring 58B and the second row of apertures 72A within the cowl interface ring 58A are aligned with the second row of apertures 72B within the acoustic nozzle interface ring 58B when the interface ring assembly 58 is assembled. Each aperture in the first row of apertures 70A, 70B are staggered relative each aperture in the second row of apertures 72A, 72B to define a staggered relationship which minimizes stress concentrations.

Figure 4C:
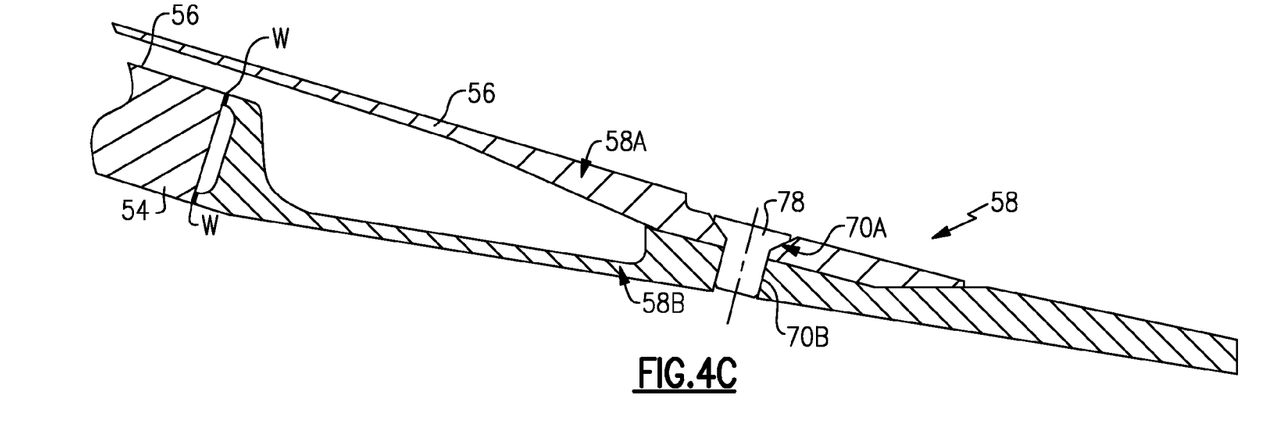
FIG. 4C is an expanded sectional view of an interface ring of the primary exhaust nozzle.

The first row of apertures 70A within the cowl interface ring 58A include a counter bore 74 such that fasteners secured therein are flush with a recessed surface 76 formed therein. The first row of apertures 70B within the acoustic nozzle interface ring 58B receives a multiple of flush head fasteners 78 such as a flush head rivet (FIG. 4C) to assemble the interface ring assembly 58. It should be understood that various other flush head fasteners such as threaded bolts may alternatively or additionally be utilized.

Figure 4D:
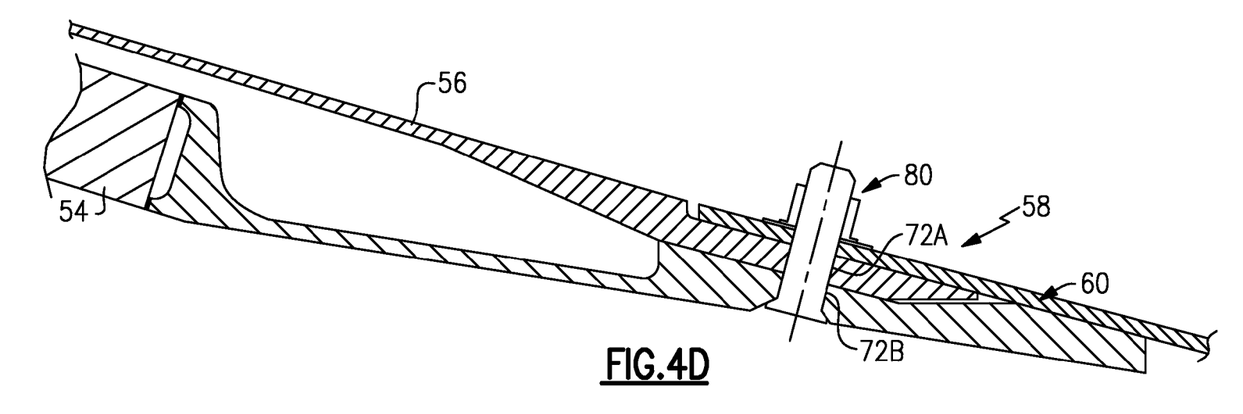
FIG. 4D is an expanded sectional view of an interface ring of the primary exhaust nozzle in a ground test condition.

Referring to FIG. 4D, once the cowl interface ring 58A is assembled to the acoustic nozzle interface ring 58B with the multiple of flush head fastener 78, the removable nozzle sections 60 is assembled to the recessed surface 76 to trap the multiple of flush head fasteners 78. The removable nozzle sections 60 may be attached to the cowl interface ring 58A and the acoustic nozzle interface ring 58B with a removable fastener 80 such as a Hi-Lok pin, washer and nut assembly.

The cowl interface ring 58A is assembled to the acoustic nozzle interface ring 58B with, for example only, sixty concentric flush head rivets 78, while the various removable nozzle sections 60, for example only, the nominal core nozzle exit area 42A; +core nozzle exit area 42B; and −core nozzle exit area 42C (FIG. 3C) are removed and re-attached with the removable fasteners 80. It should be understood that any number and configuration of the removable nozzle sections 60 may be selected and removably attached for ground testing and performance analysis as various exit area extensions are often required due to the unique shape of the aero lines of particular primary exhaust nozzle 50 require significant testing that renders the conventional section-cut off method to be replaced.

Figure 4E:
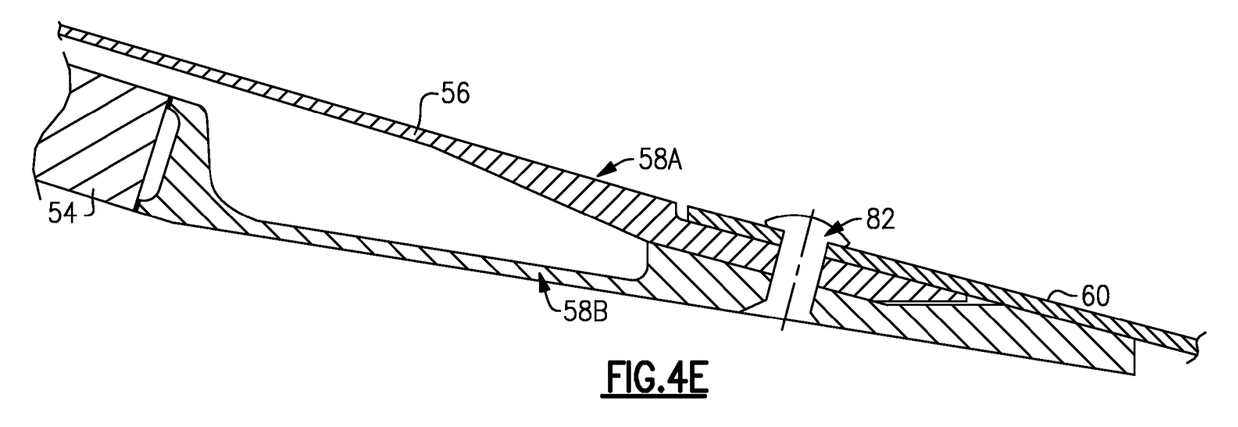
FIG. 4E is an expanded sectional view of an interface ring of the primary exhaust nozzle in a flight test condition.

Once a particular removable nozzle section 60 is determined and selected, that removable nozzle sections 60 and the removable fasteners 80 are removed and the particular removable nozzle sections 60 is riveted into place with rivets 82 for flight test (FIG. 4E). A secure flight-ready primary exhaust nozzle 50 is thereby provided.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the disclosure herein.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. Although certain particular non-limiting exemplary embodiments of this invention have been disclosed, one of ordinary skill in the art would recognize that certain modifications would be within the scope of this invention. It is, therefore, to be understood that within the scope of the appended claims, the invention may be practiced otherwise than as specifically described. For that reason the following claims should be studied to determine the true scope and content of this invention.

What is claimed is:

1. An exhaust nozzle for a gas turbine engine comprising:
   an outer cowl defined about an axis;
   a cowl interface ring attached to said outer cowl, said cowl interface ring defined about said axis;
   an acoustic nozzle defined about said axis to receive an engine exhaust;
   an acoustic nozzle interface ring attached to said acoustic nozzle, said acoustic nozzle interface ring defined about said axis, said acoustic nozzle interface ring attachable to said cowl interface ring; and
   a removable nozzle section defined about said axis, said removable nozzle section attachable to said acoustic nozzle interface ring and said cowl interface ring to receive said cowl interface ring at least partially between said nozzle interface ring and said removable nozzle section, said cowl interface ring and said acoustic nozzle interface ring includes a first row of apertures and a second row of apertures directed in a radial direction relative to said axis.

2. The exhaust nozzle as recited in claim 1, wherein said outer cowl and said acoustic nozzle form a section of a core cowl.

3. The exhaust nozzle as recited in claim 1, wherein said cowl interface ring is welded to said outer cowl.

4. The exhaust nozzle as recited in claim 1, wherein said acoustic nozzle interface ring is welded to said acoustic nozzle.

5. The exhaust nozzle as recited in claim 1, wherein said first row of apertures are staggered relative to said second row of apertures generally along said axis.

6. The exhaust nozzle as recited in claim 1, wherein said acoustic nozzle interface ring is attached to said cowl interface ring with a first multiple of fasteners through said first row of apertures, said first multiple of fasteners trapped by said removable nozzle section.

7. The exhaust nozzle as recited in claim 6, wherein said first multiple of fasteners are flush head fasteners.

8. The exhaust nozzle as recited in claim 6, wherein said first multiple of fasteners are rivets.

9. The exhaust nozzle as recited in claim 1, wherein said removable nozzle section is attachable to said acoustic nozzle interface ring and said cowl interface ring with a second multiple of fasteners through said second row of apertures, said second multiple of fasteners pass through said cowl interface ring, said nozzle interface ring and said removable nozzle section.

10. The exhaust nozzle as recited in claim 9, wherein said second multiple of fasteners are removable fasteners.

11. The exhaust nozzle as recited in claim 9, wherein said second multiple of fasteners are rivets.

12. The exhaust nozzle as recited in claim 1, wherein said cowl interface ring and said acoustic nozzle interface ring includes a first row of apertures and a second row of apertures, said acoustic nozzle interface ring attached to said cowl interface ring with a first multiple of fasteners through said first row of apertures, said first multiple of fasteners trapped by said removable nozzle section, said removable nozzle section attachable to said acoustic nozzle interface ring and said cowl interface ring with a second multiple of fasteners through said second row of apertures, said second multiple of fasteners pass through said cowl interface ring, said nozzle interface ring and said removable, nozzle section.

13. The exhaust nozzle as recited in claim 12, wherein said first multiple of fasteners are flush head fasteners and said second multiple of fasteners are removable fasteners.

14. The exhaust nozzle as recited in claim 12, wherein said first multiple of fasteners are flush head fasteners and said second multiple of fasteners are rivets.

15. The exhaust nozzle as recited in claim 1, wherein said acoustic nozzle interface ring is attached to said cowl interface ring with a first multiple of fasteners through said first row of apertures, said first multiple of fasteners do not pass through said removable nozzle section.

16. The exhaust nozzle as recited in claim 15, wherein said removable nozzle section extends downstream of said acoustic nozzle interface ring.

17. The exhaust nozzle as recited in claim 1, wherein said removable nozzle section extends downstream of said outer cowl interface ring.

* * * * *